(12) United States Patent
Matsuo et al.

(10) Patent No.: US 6,201,396 B1
(45) Date of Patent: Mar. 13, 2001

(54) APPARATUS FOR PREDICTING EARTHQUAKES AND OTHER TERRESTRIAL EVENTS

(76) Inventors: Tomoo Matsuo, 4-3-5, Jindaijikita-machi, Chofu-shi; Ayako Isikawa; Akira Isikawa, both of 5-28-25, Skakujiidai, Nerima-ku, all of Tokyo (JP)

( * ) Notice: Subject to any disclaimer, the term of this patent is extended or adjusted under 35 U.S.C. 154(b) by 0 days.

(21) Appl. No.: 09/261,490

(22) Filed: Mar. 3, 1999

(30) Foreign Application Priority Data

Mar. 10, 1996 (JP) .................................... 10-057960

(51) Int. Cl.$^7$ ...................................... G01V 3/00

(52) U.S. Cl. ...................... 324/345; 324/259; 33/355 R

(58) Field of Search .................... 324/345, 259, 324/8, 207, 323, 344; 340/690, 669, 540; 33/364, 355 R

(56) References Cited

U.S. PATENT DOCUMENTS

| | | | | |
|---|---|---|---|---|
| 4,156,178 | * | 5/1979 | Stockton | 324/8 |
| 4,217,699 | * | 8/1980 | Stockton | 324/355 R |
| 4,288,927 | * | 9/1981 | Stocton | 33/355 R |
| 4,980,644 | * | 12/1990 | Todorov | 324/345 |
| 5,418,523 | * | 5/1995 | Anderson et al. | 340/690 |

* cited by examiner

*Primary Examiner*—Christine Oda
*Assistant Examiner*—Subhash Zaveri
(74) *Attorney, Agent, or Firm*—Lorusso & Loud

(57) ABSTRACT

A terrestrial change prediction apparatus including an indicator having a fixing member made of a nonmagnetic material and a plurality of magnetic bodies each having an N-pole end and an S-pole end and fixedly secured to the fixing member with the same magnetic polarity ends facing to each other so that a magnetic repulsive force is produced therebetween. The indicator is rotatably supported such that the magnetic bodies normally orient in a substantially constant direction. Before a terrestrial change such as an earthquake occurs, the indicator displaces. By measuring the displacement of the indicator, an occurrence of a terrestrial change can be predicted.

9 Claims, 9 Drawing Sheets

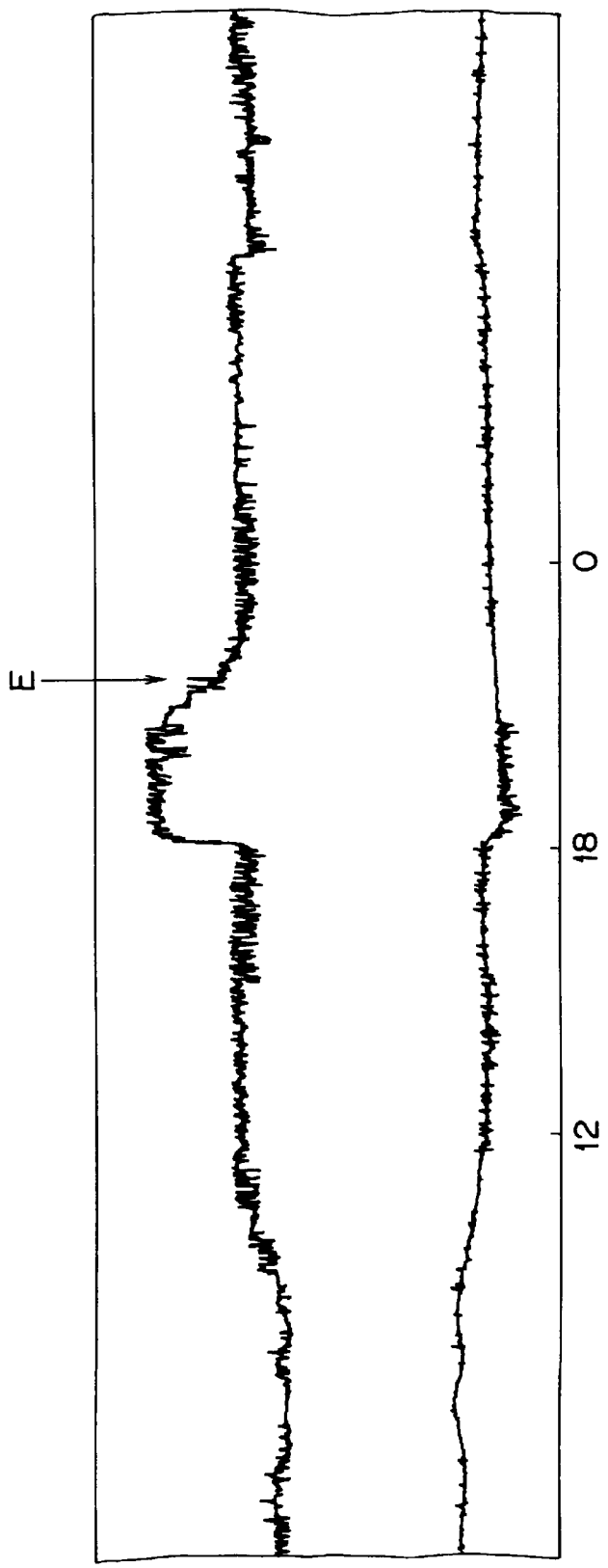

APPARATUS FOR PREDICTING EARTHQUAKES AND OTHER TERRESTRIAL EVENTS

BACKGROUND OF THE INVENTION

This invention relates to a terrestrial change predicting apparatus for indicating terrestrial changes in advance.

Terrestrial changes include, for example, crustal deformation, diastrophism and meteorological changes. Of such changes, the diastrophism in particular causes earthquake and its prediction is strongly desired. Known apparatuses for predicting earthquakes are such that seismometers are placed in many locations to collect data from such seismometers and make predictions by empirically analyzing such data.

Although it is termed the prediction of earthquake, the conventional method uses the pattern of the past data and its prediction accuracy is not good enough to prevent tragic disaster such as that caused by the great Hanshin-Awaji earthquake in Japan.

SUMMARY OF THE INVENTION

The present invention has been made to solve the above problem and has as its objects provision of a terrestrial change prediction apparatus for indicating geo-storm in a simple manner. It is a special object of the present invention to provide an earthquake prediction apparatus.

In accordance with the present invention, there is provided a terrestrial change prediction apparatus, comprising:
an indicator comprising a fixing member made of a nonmagnetic material and a plurality of magnetic bodies each having an N-pole end and an S-pole end and fixedly secured to said fixing member with said ends having the same magnetic polarity facing to each other so that a magnetic repulsive force is produced therebetween; and
support means for rotatably supporting said indicator such that said magnetic bodies normally orient in a substantially constant direction.

It has been found that when a compression or slip is caused by a very high pressure between two bodies, a phenomenon that the above-described indicator rotates slightly occurs. Such a phenomenon is also observed before an earthquake occurs. Such a phenomenon is termed "geo-storm phenomenon" herein.

BRIEF DESCRIPTION OF THE DRAWINGS

Other objects, features and advantages of the present invention will become apparent from the detailed description of the preferred embodiments of the invention which follows, when considered in light of the accompanying drawings, in which:

FIGS. 8 through 11 are charts showing recorded data by the apparatus according to the present invention.

DETAILED DESCRIPTION OF THE PREFERRED EMBODIMENTS OF THE INVENTION

Figure 1:
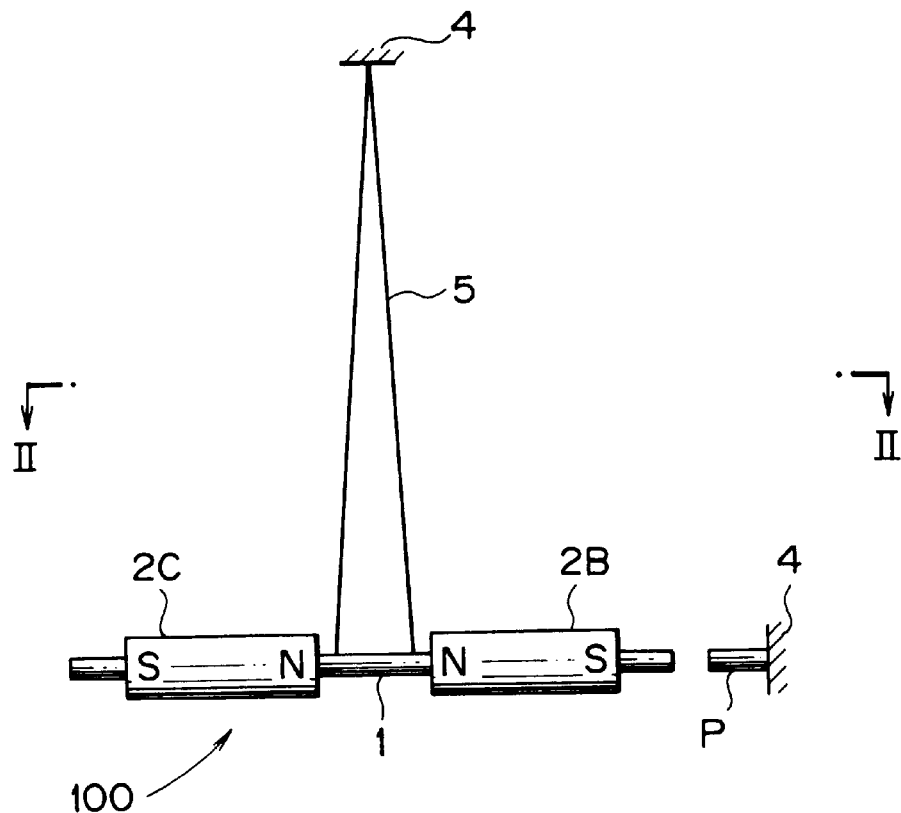
FIG. 1 is an elevational view schematically illustrating one embodiment of a terrestrial change prediction apparatus according to the present invention.
Figure 2:
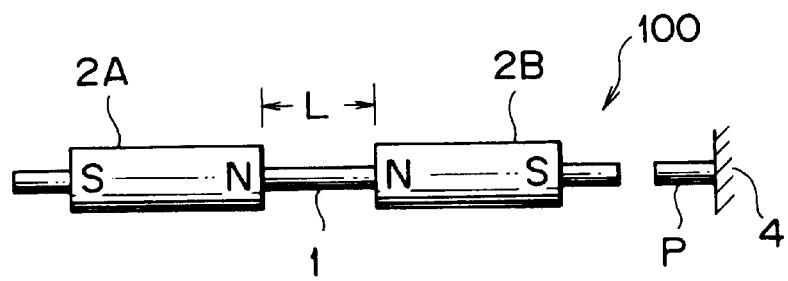
FIG. 2 is a sectional view taken along the line II—II in FIG. 1.

Referring now to FIGS. 1 and 2, a terrestrial change prediction apparatus according to the present invention has an indicator 100 which comprises a fixing member 1 and two magnetic bodies, such as permanent magnets 2B and 2C, each having an N-pole end and an S-pole end and fixedly secured to the fixing member 1 with their same poles opposed to each other.

In the embodiment shown, two permanent magnets 2A and 2B are arranged with their N-pole ends face to each other. However, the indicator 100 may be constructed with the S-pole ends thereof face to each other. The fixing member is made of a nonmagnetic material such as aluminium, bamboo, wood or plastic. In the embodiment shown, a wooden rod is used as the fixing member 1 and is inserted into through holes of the permanent magnets 2B and 2C. The magnets 2B and 2C are bonded to the fixing member 1 with an adhesive and spaced apart from each other a distance L so that a repulsive force is produced between the same poles N and N.

For reasons of improved sensitivity to terrestrial change, it is preferred that the distance L be as small as possible. Though not essential, the two magnets 2B and 2C preferably have similar magnetic characteristics and preferably align substantially linearly as viewed vertically as shown in FIG. 1.

Support means 5 is provided for rotatably supporting the indicator 100 such that the magnets 2A and 2B normally orient in a substantially constant direction. In the embodiment shown, the rod 1 as the supporting member orients nearly east and west. Generally, however, the indicator 100 does not normally cease at a fixed orientation but, rather, generally slightly vibrates (rotates clockwise and counterclockwise) when constructed to have a high sensitivity.

In the embodiment shown, the indicator 100 is suspended by a low rigidity string 5 secured to stationary frame 4 so that the indicator 100 may be rotated with a very small external force. A pointer P spaced from one end of the indicator shaft 1 is secured to the frame 4.

The construction of the indicator 100 may be modified or changed in various manners. For example, the magnet bodies 2A and 2B can be formed into various shape such as a disc. In place of the permanent magnet, a conductor having a coil connected to a DC power may be used, if desired. A wooden or plastic container such as in a cylindrical shape may be used as a fixing member for fixedly accommodating the magnet bodies 2A and 2B with a slight gap being defined therebetween. Further, as long as the indicator 100 is freely rotatable in both directions, the construction of the support means 5 may be changed without limitation. The axis of rotation of the indicator 100 may be offset from the center of the distance L.

Next, the function of the geo-storm indicator 100 shown in FIGS. 1 and 2 will be described.

The indicator 100, when left in a normal state, comes to a stabilized state near east to west. The position of the indicator 100 in this state is determined relative to the pointer P. When a terrestrial change occurs, the orientation of the indicator 100 changes. Thus, the indicator vibrates (rotates clockwise and counterclockwise) with a significantly different amplitude. By observing a displacement of the indicator 100 relative to the pointer P, a terrestrial change can be detected.

Next, another embodiment of a terrestrial change predicting apparatus using the above geo-storm indicator 100 will be explained in reference to FIG. 4. A magnetic needle 6 indicating the direction of the geomagnetism is held in suspension with a string 7 at its center in the horizontal state. The upper end of the string 7 is secured to the center of the indicator 100, so that the magnetic needle 6 does not rotate even if the indicator shaft 1 rotates and that the magnetic needle 6 serves as a reference point P in FIG. 1 for measurements. The symbol 8 denotes a ring-shaped angular dial plate, with graduations of 360 degrees on the entire circumference. At opposing center-symmetric two points, the dial plate 8 is secured to both ends of the indicator 100 with a string 10, so as to rotate with the indicator 100 by the same rotation angle as that of the indicator 100.

In this way, a rotation amount indicating means is constituted of the magnetic needle 6, the string 7, the angular dial plate 8, and the string 10 for indicating a displacement of the indicator 100 from the normal position.

The apparatus shown in FIG. 3 operates as follows. In the normal state, the indicator 100 orients near east and west. In that state, the magnetic needle 6 points to 0 of the graduation 9 on the angular dial plate 8. However, a slight change in the angle of the indicator 100 occurs when daily observation is continued. The change can be read as the deviation angle on the angular dial plate 8. Such a change has started before a diastrophism occurs. When the diastrophism subsides, the indicator 100 returns to the original position. This is the geo-storm phenomenon.

Table 1 below shows an example of observed data. This data was collected by observation during a period of 29 days from Nov. 23 to Dec. 21, 1998 (including one day off during the period) in Chofu City, Tokyo. Observation was made every day at about 6:00 in the morning.

TABLE 1

| Date | Displacement Angle (°) | Terrestrial Change Reported |
|---|---|---|
| 11/23 | +1.5 | Earthquake of magnitude 4 at Yamagata*1 |
| 11/24 | +1.0 | |
| 11/25 | −0.2 | |
| 11/26 | +0.6 | |
| 11/27 | +2 to −0.5 | Typhoon |
| 11/28 | 0 | |
| 11/29 | +1.3 | Earthquake of magnitude 4.5 at Tohoku*2 |
| 11/30 | +1.0 | |
| 12/01 | 0 | |
| 12/02 | 0 | |
| 12/03 | +1.0 | |
| 12/04 | +1.0 | Earthquake at Ibaraki*3 |
| 12/05 | 0 | |
| 12/06 | +0.5 | Earthquake of magnitude 4 at Chiba*4 |
| 12/07 | 0 | |
| 12/08 | 0 | |
| 12/09 | +1.2 | |
| 12/10 | +1.8 | Earthquake at Kanto*5 |
| 12/11 | 0 | |

TABLE 1-continued

| Date | Displacement Angle (°) | Terrestrial Change Reported |
|---|---|---|
| 12/12 | 0 | |
| 12/13 | 0 | |
| 12/14 | not measured | |
| 12/15 | 0 | |
| 12/16 | 0 | |
| 12/17 | 0 | |
| 12/18 | 0 | |
| 12/19 | −2.0 | Earthquake of magnitude 4 at Kanto*5 |
| 12/20 | 0 | |
| 12/21 | 0 | |

*1: about 180 km away from Chofu
*2: about 200 km away from Chofu
*3: about 100 km away from Chofu
*4: about 50 km away from Chofu
*5: about 50 km away from Chofu From the above data, it will be appreciated that the geo-storm phenomenon has a close connection with earthquakes. About 80% of the earthquakes occurring within 300 km of Tokyo can be predicted.

Figure 3:
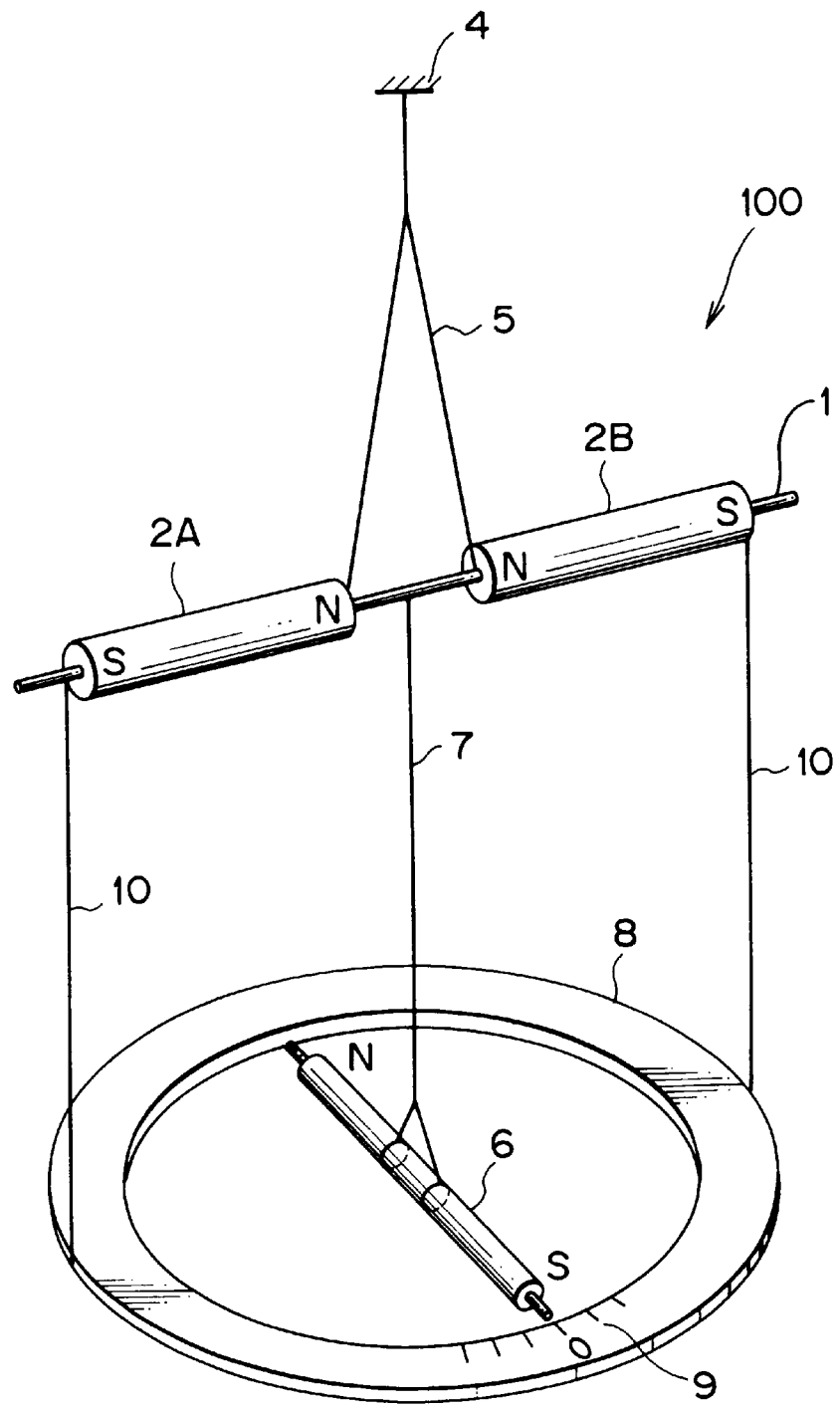
FIG. 3 is a perspective view showing another embodiment of a terrestrial change prediction apparatus according to the present invention.

The apparatus of FIG. 3 may be provided with an arrangement in which the displacement of the magnetic needle 6 relative to the angular dial plate 8, namely the rotation amount of the indicator 100, is automatically read optically, mechanically, or electrically, to generate an alarm, so that it is possible to predict a terrestrial change and take prompt measures. It is also possible to infer the locations where earthquakes will occur by placing a number of the terrestrial change prediction apparatuses of this invention at many selected places and by processing the data statistically.

Figure 4:
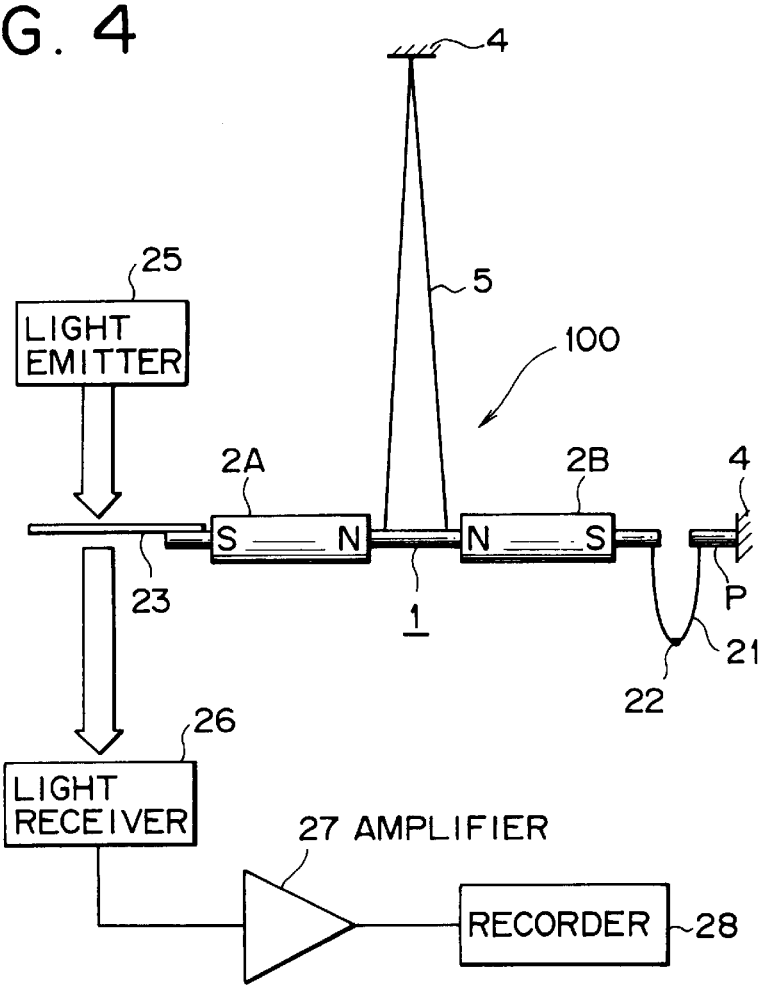
FIG. 4 is a an elevational view schematically illustrating a further embodiment of a terrestrial change prediction apparatus according to the present invention.

FIG. 4 shows a further embodiment in which the apparatus shown in FIG. 3 is further provided with (a) recording means coupled with the indication means for continuously recording displacements of the indicator 100 and (b) a brake. In FIG. 4, component parts similar to those in FIG. 3 are designated by the same reference numerals.

A string 21 having a surplus length interconnects one end of the indicator 100 and the pointer P, with a weight 22 attached at a midpoint. When such a big terrestrial change that would cause a rotation of the indicator 100 through a large angle, the weight 22 serves as a brake to reduce the rotation angle of the indicator 100. With a small terrestrial change, however, the braking effect is very small. Thus, the sensitivity of the apparatus is not adversely affected. The provision of the brake is also advantageous for the prevention of 180° turn of the indicator 100.

Figure 6:
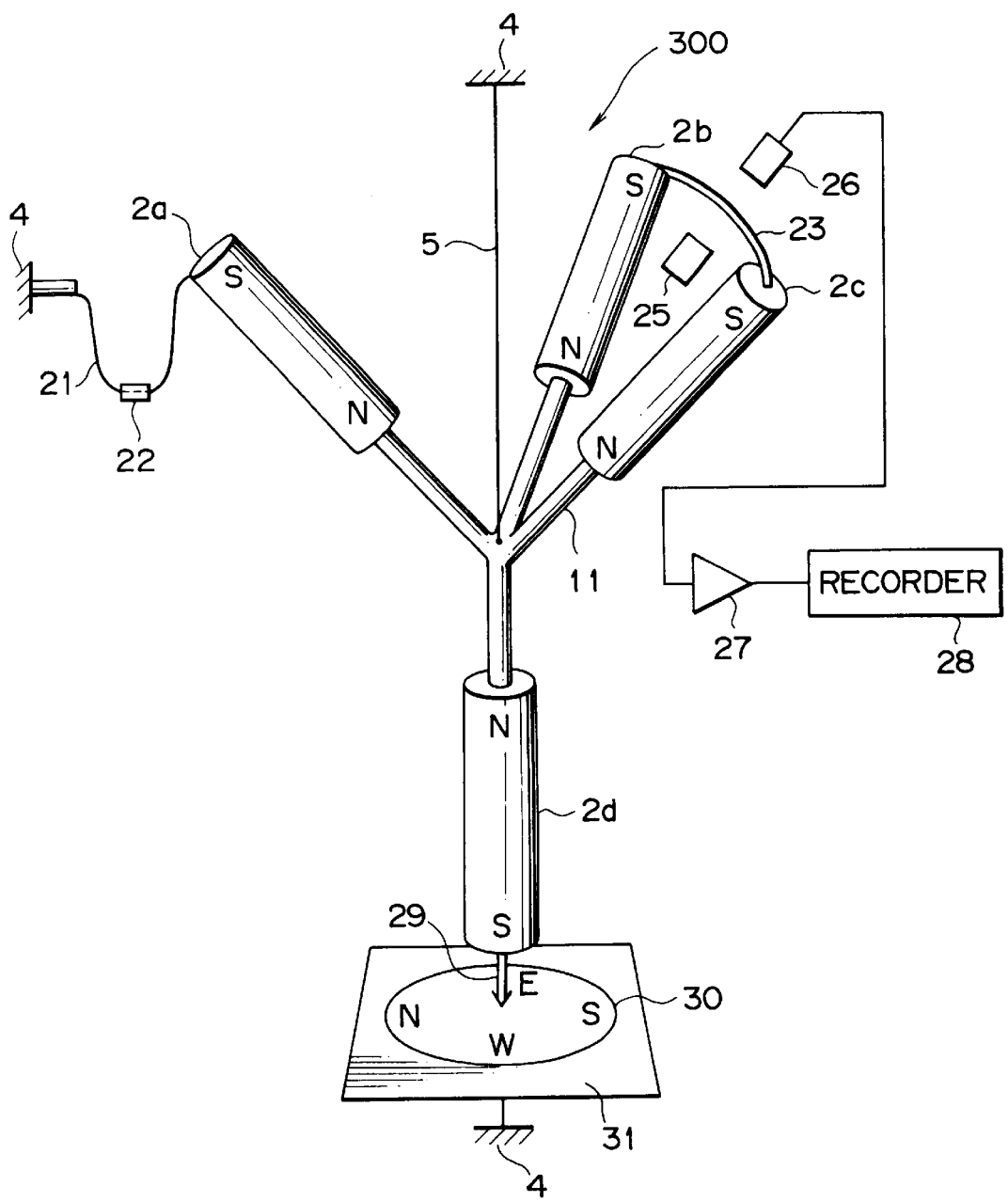
FIG. 6 a perspective view showing a further embodiment of a terrestrial change prediction apparatus according to the present invention.

The recording means is constructed as follows. A shade 23 is attached to one end the indicator 100 (in the illustrated case, an end portion of the permanent magnet 2A) for rotation therewith. The shade 23 is provided, as shown in FIG. 6, with a slot 24 with its width varying along its rotating direction. On one side of the shade 23 is disposed a light emitter 25 for emitting infrared rays or any other suitable light and, on the other side, a light receiver or sensor 26. The amount of light passing through the slot 24 varies according to the rotation amount of the indicator 100, so that an electric output corresponding to the displacement of the indicator is obtained from the light receiver 26. The electric output from the receiver 26 is amplified with an amplifier 27 and recorded on a recording paper sheet or the like with a recorder 28.

Thus, with the apparatus shown in FIG. 4, terrestrial changes can be automatically continuously measured.

Figure 7:
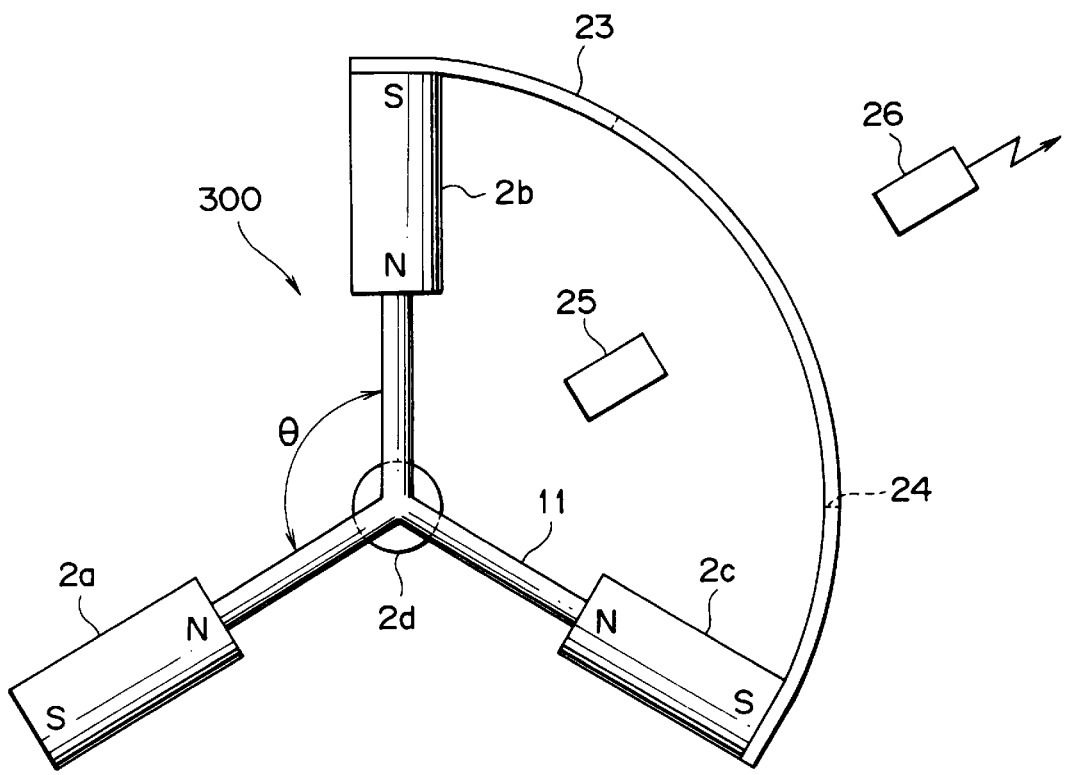
FIG. 7 is an enlarged plan view showing an arrangement of magnets of the embodiment shown in FIG. 6.

FIGS. 6 and 7 show a further embodiment of a terrestrial change prediction apparatus according to the invention.

Designated as 300 is a geo-storm indicator having four magnetic bodies 2a through 2d. The magnetic body 2d orients substantially vertically downward with the other three magnetic bodies 2a through 2c orienting radially obliquely upward and with an angle θ between any adjacent two magnetic bodies of the other three magnetic bodies 2a through 2c being greater than 90° as viewed vertically (as shown in FIG. 7).

In the specific embodiments shown, the permanent magnets 2a through 2c are disposed in symmetry with respect to their center. In other words, the magnets 2a through 2c are disposed as equally spaced from each other on a generatrix line of an inverted regular cone. The permanent magnet 2d is disposed so that the line extending between its N and S poles is directed in the vertical direction, and located below the permanent magnets 2a through 2c. To the center of the connecting arms (fixing member) 11 is secured one end of the string 5, while the other end of the string 5 is secured to a stationary frame 4.

When the indicator 300 is in the suspended state and when one of the three magnets (for example magnet 2a) is oriented north, the indicator 300 assumes a stationary state. In this case, the other two magnets 2b and 2c serve to function as magnets 2A and 2B in FIG. 1.

The end of the permanent magnet 2a and the frame 4 are interconnected through a string 21 with its center provided with a weight 22. The symbols 25, 26, and 27 denote, like those shown in FIG. 4, a shade, a light emitter, a light receiver, and an amplifier, respectively. The symbol 28 denotes a recorder. A pointing needle 29 is attached to the underside of the permanent magnet 2d so as to point the azimuth of east (E), west (W), south (S), or north (N), on an azimuth plate 30 attached to a securing plate 31 secured to the frame 4.

The apparatus shown in FIG. 6 has lower sensitivity as compared with the apparatus shown in FIG. 4 but is advantageously used in combination with the apparatus shown in FIG. 4 to more precisely predict occurrence of terrestrial changes. Additionally, the apparatus of FIG. 6 makes it possible to determine the approximate direction, as seen from the observation point, in which an earthquake occurs, when installed at plural locations.

Namely, when a terrestrial change occurs, the indicator 300 displaces. The displacement is measured by the indication means 24, 25 and 26 and recorded by the recorder 28. In this case, the pointing needle 29 also displaces. By providing a suitable detector (not shown) for indicating a two-dimensional displacement of the pointing needle 29, and by obtaining such information at various different locations, it is possible to predict not only the occurrence of a terrestrial change but also a location at which such a change occurs.

The apparatus of FIG. 6 may be modified and changed in various manners. The angle θ between the two adjacent magnets is not necessarily the same. Also the length and magnetic characteristics of the four magnets 2a–2d may be different from each other. Further, the number of the magnets can be increased. The orientation of the magnet 2d is not necessarily vertically downward but may be tilted.

Figure 8:
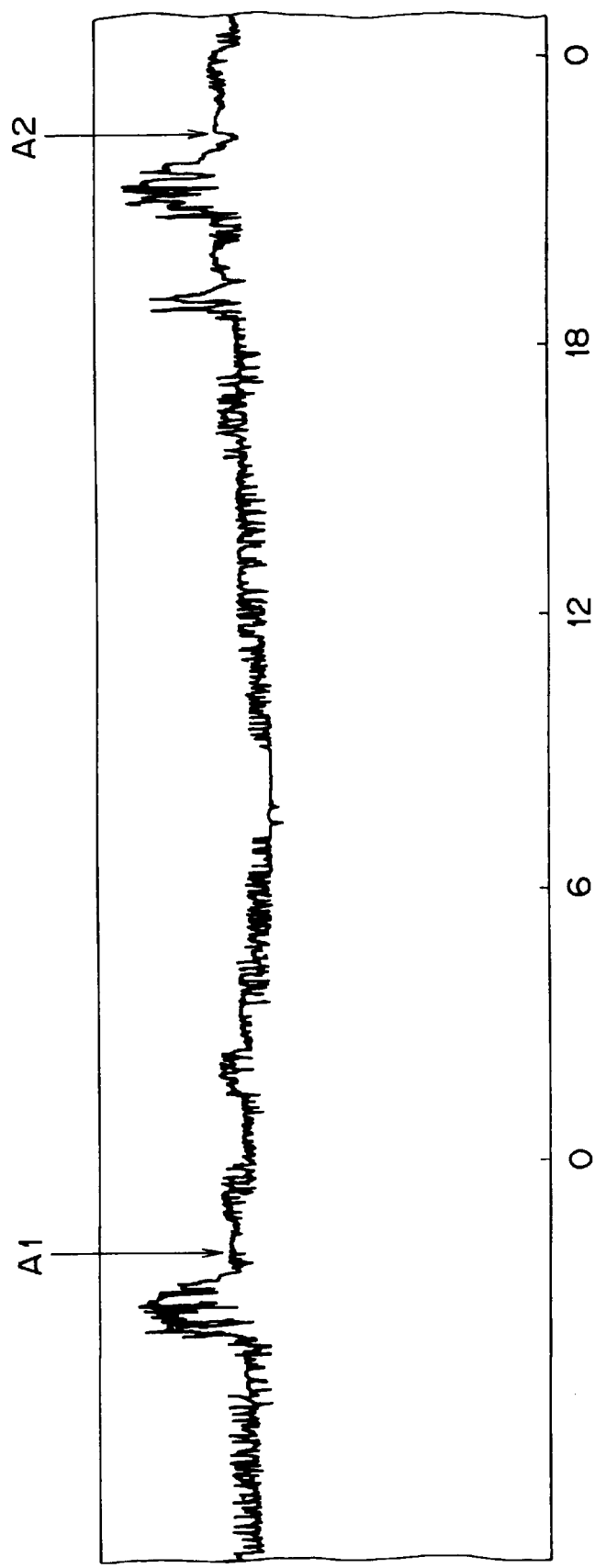
Figure 9:
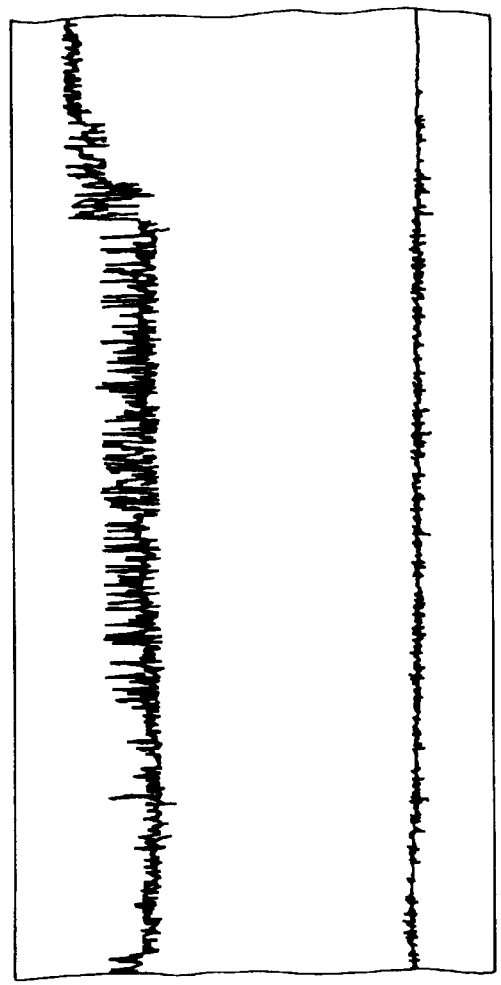
Figure 9:
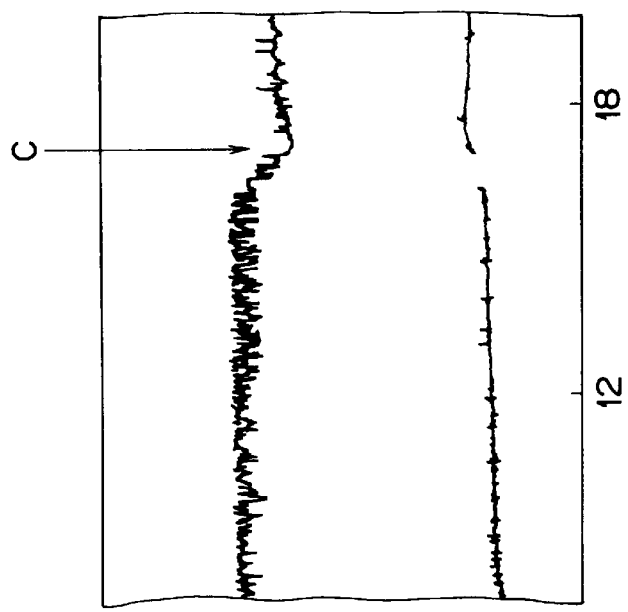
Figure 10:
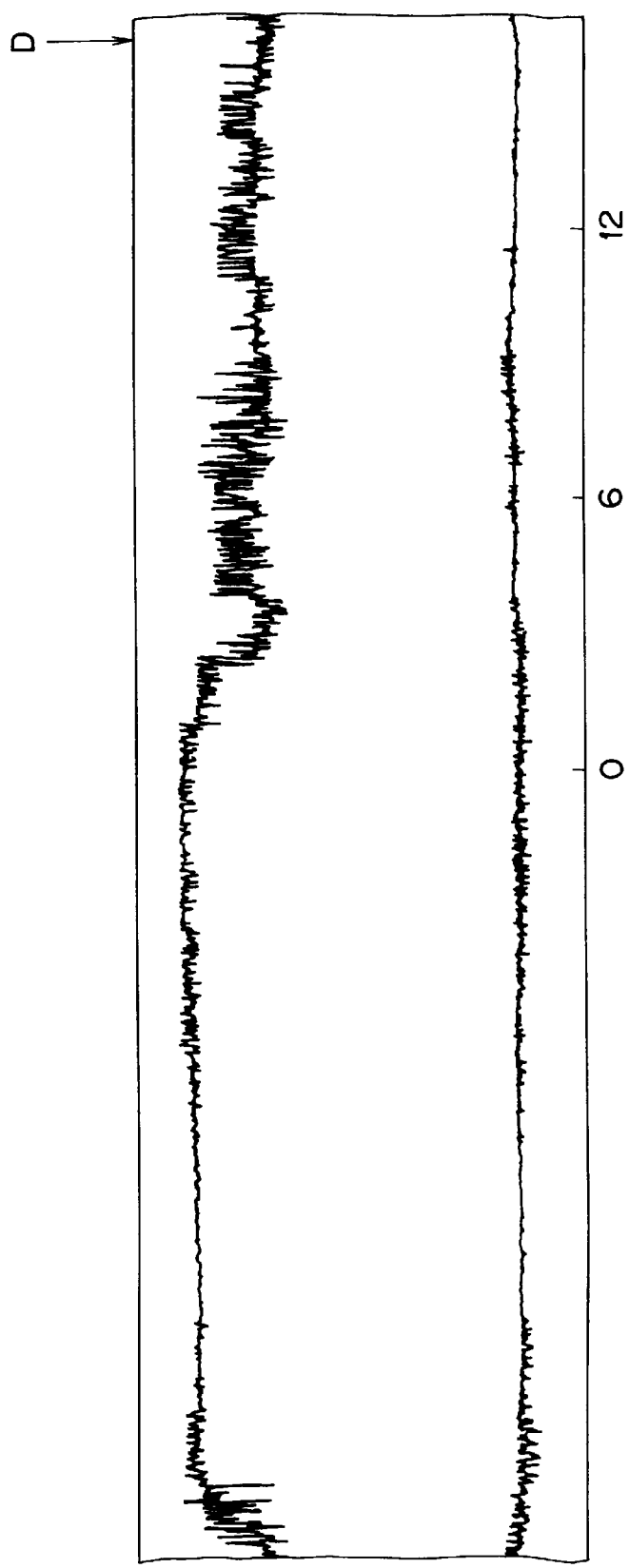

FIGS. 8 shows an example of records obtained using the apparatus shown in FIG. 4, while FIGS. 9–11 illustrate examples of records obtained using a combination of the apparatuses shown in FIGS. 4 and 6. In FIGS. 9–11, the upper and lower charts represent the records by the indicators 100 and 300, respectively, of FIGS. 4 and 6. The measurement was performed at Chofu. The abscissa represents time while the ordinate amplitude, i.e. displacement of the indicator.

FIG. 8 is a record for a period of between August 11, 4:00 PM to August 13, 1:00 AM, 1998. Volcanic earthquakes occurred at Nagano (about 180 km away from Chofu) at time points shown by A1 and A2.

FIG. 9 is a record for a period of Sep. 18, 1998. An earthquake (M4.5) of a diastrophism type occurred at Nagano (about 180 km away from Chofu) at about 17:00 of Sep. 18, 1998 shown by C. This earthquake had a long period, and occurred five days after the appearance of the change in the data.

FIG. 10 is a record for a period of Sep. 15, 1998. Influence of a typhoon is overlapped the data of the diastrophism. An earthquake of a diastrophism type occurred at the time point D (about 16:00) in Sendai about 300 km away from Chofu.

FIG. 11 is a record for a period of between Sep. 22 and 23, 1998. A typhoon passed over the Japan Sea. An earthquake occurred in Nagano about 180 km away from Chofu at about September 22, 22:30 shown by E.

The above recorded data indicate as follows:

(1) A volcanic-type earthquake occurs toward the end of a mound-shaped waveform of a large amplitude extending over 2 to 3 hours, with several waveform disturbances per day. Therefore, the time zone to take care and the dangerous time zone (end of the mound shape waveform) can be roughly inferred and predicted.

(2) A double track recording by combination of two indicators 100 and 300 increases reliability.

(3) Earthquakes caused by the diastrophism are associated with a waveform having a large change in the displacement, a long period ranging from about 2 to about 6 days, and less waveform disturbances where the displacement is large. Earthquakes of this type occur also within a few hours of the start of returning of the displacement to the original state or after the return of the displacement.

(4) While the apparatus responds to the passage of weather fronts and typhoons, the changes due to such phenomena are small and the waveform is peculiar, and therefore discernible from earthquakes.

(5) Even when an earthquake occurs simultaneous with the weather front or typhoon, the waveform of the earthquake is discernible because of its peculiar features.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. H10-57960, filed Mar. 10, 1998, inclusive of the specification, claims and drawings, are hereby incorporated by reference herein.

What is claimed is:

1. A terrestrial change prediction apparatus, comprising:
   an indicator comprising a fixing member made of a nonmagnetic material and two magnetic bodies linearly aligned on said fixing member, each of said magnetic bodies having an N-pole end and an S-pole end and fixedly secured to said fixing member, wherein ends of said magnetic bodies having the same magnetic polarity face each other so that a magnetic repulsive force is produced therebetween; and
   support means for rotatably supporting said indicator such that said magnetic bodies normally orient in a substantially East and West direction.

2. An apparatus as claimed in claim 1, further comprising indication means for indicating an angular displacement of said magnetic bodies from said East and West direction.

3. An apparatus as claimed in claim 2, further comprising recording means coupled with said indication means for continuously recording displacements of said magnetic bodies indicated by said indication means.

4. An apparatus as claimed in claim 1, further comprising a flexible string having a first end connected to an end portion of said indicator and a second end, and a weight secured to an intermediate portion of said flexible string, said second end being fixed such that said weight is suspended by said flexible string.

5. A terrestrial change prediction apparatus, comprising:

an indicator comprising a fixing member made of a nonmagnetic material and four magnetic bodies each having an N-pole end and an S-pole end and fixedly secured to said fixing member, wherein one of said four magnetic bodies is oriented substantially vertically and the other three magnetic bodies are oriented radially obliquely outward of said one magnetic body, with an angle between any adjacent two magnetic bodies of said the other there magnetic bodies being greater than 90° as viewed vertically, and wherein said other three magnetic bodies all have a lowermost end having the same magnetic polarity as an uppermost end of said one magnetic body, with said lowermost ends facing said uppermost end; and support means for rotatably supporting said indicator such that said magnetic bodies normally orient in a substantially constant direction.

6. A terrestrial change prediction apparatus as claimed in claim 5 wherein said support means is at least one strand by which said fixing member hangs suspended.

7. A terrestrial change prediction apparatus as claimed in claim 1 wherein said two linearly aligned magnetic bodies are spaced apart.

8. A terrestrial change prediction apparatus as claimed in claim 1 wherein said fixing member is an elongated cylinder and wherein said magnetic bodies are coaxial with and spaced apart along said elongated cylinder.

9. A terrestrial change prediction apparatus as claimed in claim 1 wherein said support means is at least one strand by which said fixing member hangs suspended.

* * * * *

UNITED STATES PATENT AND TRADEMARK OFFICE
CERTIFICATE OF CORRECTION

PATENT NO.     : 6,201,396 B1
DATED          : March 13, 2001
INVENTOR(S)    : Matsuo et al.

It is certified that error appears in the above-identified patent and that said Letters Patent is hereby corrected as shown below:

Delete Title Page and replace with attached Title Page to reflect reprinted Abstract.

Delete in its entirety columns 1-8 and replace with the attached pages reflecting reprinted columns 1-8.

Signed and Sealed this

Twelfth Day of October, 2004

JON W. DUDAS
*Director of the United States Patent and Trademark Office*

United States Patent
Matsuo et al.

(10) Patent No.: US 6,201,396 B1
(45) Date of Patent: Mar. 13, 2001

(54) APPARATUS FOR PREDICTING EARTHQUAKES AND OTHER TERRESTRIAL EVENTS

(76) Inventors: Tomoo Matsuo, 4-3-5, Jindaijikita-machi, Chofu-shi; Ayako Isikawa; Akira Isikawa, both of 5-28-25, Shakujiidai, Nerima-ku, all of Tokyo (JP)

(*) Notice: Subject to any disclaimer, the term of this patent is extended or adjusted under 35 U.S.C. 154(b) by 0 days.

(21) Appl. No.: 09/261,490

(22) Filed: Mar. 3, 1999

(30) Foreign Application Priority Data

Mar. 10, 1998 (JP) ............................ 10-057960

(51) Int. Cl.$^7$ ............................................. G01V 3/00
(52) U.S. Cl. ..................... 324/345; 324/259; 33/355 R
(58) Field of Search ............................... 324/345, 259, 324/8, 207, 323, 344; 340/690, 669, 540; 33/364, 355 R

(56) References Cited

U.S. PATENT DOCUMENTS

| | | | | |
|---|---|---|---|---|
| 4,156,178 | * | 5/1979 | Stockton | 324/8 |
| 4,217,699 | * | 8/1980 | Stockton | 324/355 R |
| 4,288,927 | * | 9/1981 | Stpcton | 33/355 R |
| 4,980,644 | * | 12/1990 | Todorov | 324/345 |
| 5,418,523 | * | 5/1995 | Anderson et al. | 340/690 |

* cited by examiner

Primary Examiner—Christine Oda
Assistant Examiner—Subhash Zaveri
(74) Attorney, Agent, or Firm—Lorusso & Loud

(57) ABSTRACT

A terrestrial change prediction apparatus including an indicator having a fixing member made of a nonmagnetic material and a plurality of magnetic bodies each having an N-pole end and an S-pole end and fixedly secured to the fixing member with the same magnetic polarity ends facing each other so that a magnetic repulsive force is produced therebetween. The indicator is rotatably supported such that the magnetic bodies normally orient in a substantially constant direction. Before a terrestrial change such as an earthquake occurs, the indicator displaces. By measuring the displacement of the indicator, an occurrence of a terrestrial change can be predicted.

9 Claims, 9 Drawing Sheets

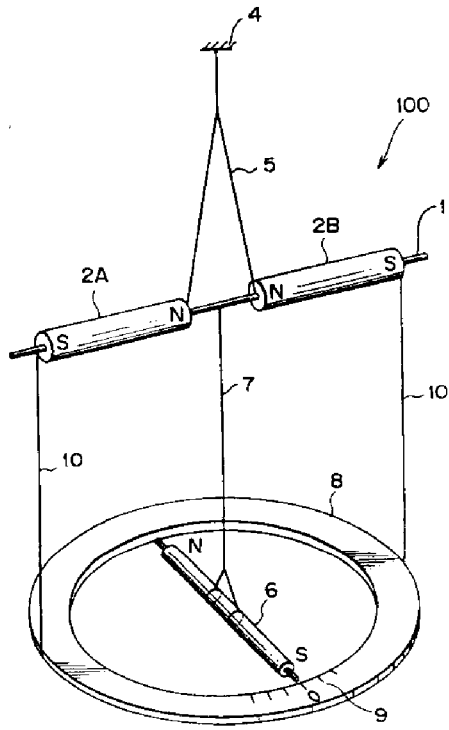

APPARATUS FOR PREDICTING EARTHQUAKES AND OTHER TERRESTRIAL EVENTS

BACKGROUND OF THE INVENTION

This invention relates to a terrestrial change predicting apparatus for indicating terrestrial changes in advance.

Terrestrial changes include, for example, crustal deformation, diastrophism and meteorological changes. Of such changes, diastrophism in particular causes earthquakes and its prediction is strongly desired. Known apparatuses for predicting earthquakes have seismometers placed in many locations, collect data from such seismometers and make predictions by empirically analyzing such data.

Although said to enable the prediction of earthquakes, the conventional method uses the pattern of the past data and its prediction accuracy is not good enough to prevent a tragic disaster such as that caused by the great Hanshin-Awaji earthquake in Japan.

SUMMARY OF THE INVENTION

The present invention has been made to solve the above problem and has as its objective provision of a terrestrial change prediction apparatus for indicating a geo-storm in a simple manner. It is a special object of the present invention to provide an earthquake prediction apparatus.

In accordance with the present invention, there is provided a terrestrial change prediction apparatus, comprising:

an indicator comprising a fixing member made of a nonmagnetic material and a plurality of magnetic bodies each having an N-pole end and an S-pole end and fixedly secured to said fixing member with said ends having the same magnetic polarity facing each other so that a magnetic repulsive force is produced therebetween; and support means for rotatably supporting said indicator such that said magnetic bodies normally orient in a substantially constant direction.

It has been found that when a compression or slip is caused by a very high pressure between two bodies, a phenomenon occurs wherein the above-described indicator rotates slightly. Such a phenomenon is also observed before an earthquake occurs. Such a phenomenon is termed "geo-storm phenomenon" herein.

BRIEF DESCRIPTION OF THE DRAWINGS

Figure 5:
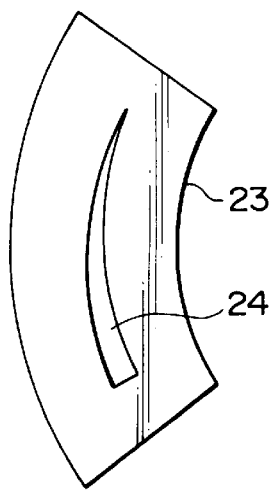
FIG. 5 is an enlarged plan view diagrammatically showing a shade used in the embodiment shown in FIG. 4.

Other objects, features and advantages of the present invention will become apparent from the detailed description of the preferred embodiments of the invention which follows, when considered in light of the accompanying drawings, in which:

FIG. 1 is an elevational view schematically illustrating one embodiment of a terrestrial change prediction apparatus according to the present invention;

FIG. 2 is a sectional view taken along the line II—II in FIG. 1;

FIG. 3 is a perspective view showing another embodiment of a terrestrial change prediction apparatus according to the present invention;

FIG. 4 is a an elevational view schematically illustrating a further embodiment of a terrestrial change prediction apparatus according to the present invention;

FIG. 5 is an enlarged plan view diagrammatically showing a shade used in the embodiment shown in FIG. 4;

FIG. 6 is a perspective view showing a further embodiment of a terrestrial change prediction apparatus according to the present invention;

FIG. 7 is an enlarged plan view showing an arrangement of magnets of the embodiment shown in FIG. 6; and FIGS. 8 through 11 are charts showing data recorded by the apparatus according to the present invention.

DETAILED DESCRIPTION OF THE PREFERRED EMBODIMENTS OF THE INVENTION

Referring now to FIGS. 1 and 2, a terrestrial change prediction apparatus according to the present invention has an indicator 100 which comprises a fixing member 1 and two magnetic bodies, such as permanent magnets 2A and 2B, each having an N-pole end and an S-pole end and fixedly secured to the fixing member 1 with the same poles facing each other.

In the embodiment shown, two permanent magnets 2A and 2B are arranged with their N-pole ends facing each other. However, the indicator 100 may be constructed with the S-pole ends thereof facing each other. The fixing member is made of a nonmagnetic material such as aluminum, bamboo, wood or plastic. In the embodiment shown, a wooden rod is used as the fixing member 1 and is inserted into through holes of the permanent magnets 2A and 2B. The magnets 2A and 2B are bonded to the fixing member 1 with an adhesive and spaced apart from each other a distance L so that a repulsive force is produced between the same poles N and N.

For reasons of improved sensitivity to terrestrial change, it is preferred that the distance L be as small as possible. Though not essential, the two magnets 2A and 2B preferably have similar magnetic characteristics and are preferably aligned substantially linearly as viewed vertically as shown in FIG. 1.

Support means 5 is provided for rotatably supporting the indicator 100 such that the magnets 2A and 2B normally orient in a substantially constant direction. In the embodiment shown, the rod 1 as the supporting member orients nearly east and west. Generally, however, the indicator 100 does not normally rest in a fixed orientation but, rather, generally slightly vibrates (rotates clockwise and counterclockwise) when constructed to have a high sensitivity.

In the embodiment shown, the indicator 100 is suspended by a low rigidity string 5 secured to stationary frame 4 so that the indicator 100 may be rotated with a very small external force. A pointer P spaced from one end of the indicator shaft 1 is secured to the frame 4.

The construction of the indicator 100 may be modified or changed in various manners. For example, the magnet bodies 2A and 2B can be formed into various shapes such as a disc. In place of the permanent magnet, a conductor having a coil connected to a DC power source may be used, if desired. A wooden or plastic container having, for example a cylindrical shape, may be used as a fixing member for fixedly accommodating the magnet bodies 2A and 2B with a slight gap being defined therebetween. Further, as long as the indicator 100 is freely rotatable in both directions, the construction of the support means 5 may be changed without limitation. The axis of rotation of the indicator 100 may be offset from the center of the distance L.

Next, the function of the geo-storm indicator 100 shown in FIGS. 1 and 2 will be described.

The indicator 100, when left in a normal state, comes to a stabilized state near east to west. The position of the indicator 100 in this state is determined relative to the pointer P. When a terrestrial change occurs, the orientation of the indicator 100 changes. Thus, the indicator vibrates (rotates clockwise and counterclockwise) with a significantly different amplitude. By observing a displacement of the indicator 100 relative to the pointer P, a terrestrial change can be detected.

Next, another embodiment of a terrestrial change predicting apparatus using the above geo-storm indicator 100 will be explained in reference to FIG. 3. A magnetic needle 6 indicating the direction of the geomagnetism is held in suspension with a string 7 at its center in the horizontal state. The upper end of the string 7 is secured to the center of the indicator 100, so that the magnetic needle 6 does not rotate even if the indicator shaft 1 rotates and that the magnetic needle 6 serves as the reference point P in FIG. 1 for measurements. The symbol 8 denotes a ring-shaped angular dial plate, with graduations of 360 degrees around its circumference. At two opposing center-symmetrical points, the dial plate 8 is secured to the ends of the indicator 100 with a string 10, so as to rotate with the indicator 100 through the same rotational angle as that of the indicator 100.

In this way, a rotation amount indicating means is constituted of the magnetic needle 6, the string 7, the angular dial plate 8, and the string 10 for indicating a displacement of the indicator 100 from the normal position.

The apparatus shown in FIG. 3 operates as follows. In the normal state, the indicator 100 orients near east and west. In that state, the magnetic needle 6 points to 0 of the graduation 9 on the angular dial plate 8. However, a slight change in the angle of the indicator 100 occurs when daily observation is continued. The change can be read as the deviation angle on the angular dial plate 8. Such a change starts before a diastrophism occurs. When the diastrophism subsides, the indicator 100 returns to the original position. This is the geo-storm phenomenon.

Table 1 below shows an example of observed data. This data was collected by observation during a period of 29 days from Nov. 23 to Dec. 21, 1998 (including one day off during the period) in Chofu City, Tokyo.

Observation was made every day at about 6:00 in the morning

| Date | Displacement Angle (°) | Terrestrial Change Reported |
|---|---|---|
| 11/24 | +1.5 | Earthquake of magnitude 4 at Yamagata*1 |
| 11/25 | +1.0 | |
| 11/26 | −0.2 | |
| 11/27 | +0.6 | Typhoon |
| 11/28 | +2 to −0.5 | |
| 11/29 | 0 | Earthquake of magnitude 4.5 at Tohoku*2 |
| 11/30 | +1.3 | |
| 12/01 | +1.0 | |
| 12/02 | 0 | |
| 12/03 | 0 | |
| 12/04 | +1.0 | Earthquake at Ibaraki*3 |
| 12/05 | 0 | |
| 12/06 | +0.5 | Earthquake of magnitude 4 at Chiba*4 |
| 12/07 | 0 | |
| 12/08 | 0 | |
| 12/09 | +1.2 | |

-continued

| Date | Displacement Angle (°) | Terrestrial Change Reported |
|---|---|---|
| 12/10 | +1.8 | Earthquake at Kanto*5 |
| 12/11 | 0 | |
| 12/12 | 0 | |
| 12/13 | 0 | |
| 12/14 | Not measured | |
| 12/15 | 0 | |
| 12/16 | 0 | |
| 12/17 | 0 | |
| 12/18 | 0 | |
| 12/19 | −2.0 | Earth of magnitude 4 at Kanto*5 |
| 12/20 | 0 | |
| 12/21 | 0 | |

*1: about 180 km away from Chofu
*2: about 200 km away from Chofu
*3: about 100 km away from Chofu
*4: about 50 km away from Chofu
*5: about 50 km away from Chofu From the above data, it will be appreciated that the geo-storm phenomenon has a close connection with earthquakes. About 80% of the earthquakes occurring within 300 km of Tokyo can be predicted.

The apparatus of FIG. 3 may be provided with an arrangement in which the displacement of the magnetic needle 6 relative to the angular dial plate 8, namely the rotation amount of the indicator 100, is automatically read optically, mechanically, or electrically, to generate an alarm, so that it is possible to predict a terrestrial change and take prompt measures. It is also possible to infer the locations where earthquakes will occur by placing a number of the terrestrial change prediction apparatuses of this invention at many selected places and by processing the data statistically.

FIG. 4 shows a further embodiment in which the apparatus shown in FIG. 3 is further provided with (a) recording means coupled with the indication means for continuously recording displacements of the indicator 100 and (b) a brake. In FIG. 4, component parts similar to those in FIG. 3 are designated by the same reference numerals.

A string 21 having a surplus length interconnects one end of the indicator 100 and the pointer P, with a weight 22 attached at a midpoint. When such a big terrestrial change that would cause a rotation of the indicator 100 through a large angle, the weight 22 serves as a brake to reduce the rotation angle of the indicator 100. With a small terrestrial change, however, the braking effect is very small. Thus, the sensitivity of the apparatus is not adversely affected. The provision of the brake is also advantageous for the prevention of a 180° turn of the indicator 100.

The recording means is constructed as follows. A shade 23 is attached to one end of the indicator 100 (in the illustrated case, an end portion of the permanent magnet 2A) for rotation therewith. The shade 23 is provided, as shown in FIG. 5, with a slot 24 with its width varying along its rotating direction. On one side of the shade 23 is disposed a light emitter 25 for emitting infrared rays or any other suitable light and, on the other side, a light receiver or sensor 26. The amount of light passing through the slot 24 varies according to the rotation amount of the indicator 100, so that an electric output corresponding to the displacement of the indicator is obtained from the light receiver 26. The electric output from the receiver 26 is amplified with an amplifier 27 and recorded on a recording paper sheet or the like with a recorder 28.

Thus, with the apparatus shown in FIG. 4, terrestrial changes can be automatically and continuously measured.

FIGS. 6 and 7 show a further embodiment of a terrestrial change prediction apparatus according to the invention.

Designated as 300 is a geo-storm indicator having four magnetic bodies 2a through 2d. The magnetic body 2d orients substantially vertically downward with the other three magnetic bodies 2a through 2c orienting radially obliquely upward and with an angle θ between any adjacent two magnetic bodies of the other three magnetic bodies 2a through 2c being greater than 90° as viewed vertically (as shown in FIG. 7).

In the specific embodiments shown, the permanent magnets 2a through 2c are disposed in symmetry with respect to their center. In other words, the magnets 2a through 2c are disposed as equally spaced from each other on a generatrix line of an inverted regular cone. The permanent magnet 2d is disposed so that the line extending between its N and S poles is directed in the vertical direction, and located below the permanent magnets 2a through 2c. To the center of the connecting arms (fixing member) 11 is secured one end of the string 5, while the other end of the string 5 is secured to a stationary frame 4.

When the indicator 300 is in the suspended state and when one of the three magnets (for example magnet 2a) is oriented north, the indicator 300 assumes a stationary state. In this case, the other two magnets 2b and 2c serve to function as magnets 2A and 2B in FIG. 1.

The end of the permanent magnet 2a and the frame 4 are interconnected through a string 21 with its center provided with a weight 22. The symbols 25, 26, and 27 denote, like those shown in FIG. 4, a shade, a light emitter, a light receiver, and an amplifier, respectively. The symbol 28 denotes a recorder. A pointing needle 29 is attached to the underside of the permanent magnet 2d so as to point the azimuth of east (E), west (W), south (S), or north (N), on an azimuth plate 30 attached to a securing plate 31 secured to the frame 4.

The apparatus shown in FIG. 6 has lower sensitivity as compared with the apparatus shown in FIG. 4 but is advantageously used in combination with the apparatus shown in FIG. 4 to more precisely predict occurrence of terrestrial changes. Additionally, the apparatus of FIG. 6 makes it possible to determine the approximate direction, as seen from the observation point, in which an earthquake occurs, when installed at plural locations.

Namely, when a terrestrial change occurs, the indicator 300 displaces. The displacement is measured by the indication means 24, 25 and 26 and recorded by the recorder 28. In this case, the pointing needle 29 also displaces. By providing a suitable detector (not shown) for indicating a two-dimensional displacement of the pointing needle 29, and by obtaining such information at various different locations, it is possible to predict not only the occurrence of a terrestrial change but also a location at which such a change occurs.

The apparatus of FIG. 6 may be modified and changed in various manners. The angle θ between the two adjacent magnets is not necessarily the same. Also the length and magnetic characteristics of the four magnets 2a–2d may be different from each other. Further, the number of the magnets can be increased. The orientation of the magnet 2d is not necessarily vertically downward but may be tilted.

FIG. 8 shows an example of records obtained using the apparatus shown in FIG. 4, while FIGS. 9–11 illustrate examples of records obtained using a combination of the apparatuses shown in FIGS. 4 and 6. In FIGS. 9–11, the upper and lower charts represent the records by the indicators 100 and 300, respectively, of FIGS. 4 and 6. The measurement was performed at Chofu. The abscissa represents time while the ordinate represents amplitude, i.e. displacement of the indicator.

FIG. 8 is a record for a period of between Aug. 11, 4:00 PM to Aug. 13, 1:00 AM, 1998. Volcanic earthquakes occurred at Nagano (about 180 km away from Chofu) at time points shown by A1 and A2.

FIG. 9 is a record for a period of Sep. 18, 1998. An earthquake (M4.5) of a diastrophism type occurred at Nagano (about 180 km away from Chofu) at about 17:00 of Sep. 18, 1998 shown by C. This earthquake had a long period, and occurred five days after the appearance of the change in the data.

FIG. 10 is a record for a period of Sep. 15, 1998. Influence of a typhoon is overlapped on the data of the diastrophism. An earthquake of a diastrophism type occurred at the time point D (about 16:00) in Sendai about 300 km away from Chofu.

FIG. 11 is a record for a period of between Sep. 22 and 23, 1998. A typhoon passed over the Japan Sea. An earthquake occurred in Nagano about 180 km away from Chofu at about September 22, 22:30 shown by S.

The above recorded data indicate as follows:

(1) A volcanic-type earthquake occurs toward the end of a mound-shaped waveform of a large amplitude extending over 2 to 3 hours, with several waveform disturbances per day. Therefore, the time zone to take care and the dangerous time zone (end of the mound shape waveform) can be roughly inferred and predicted.

(2) A double track recording by combination of two indicators 100 and 300 increases reliability.

(3) Earthquakes caused by the diastrophism are associated with a waveform having a large change in the displacement, a long period ranging from about 2 to about 6 days, and less waveform disturbances where the displacement is large. Earthquakes of this type occur also within a few hours of the start of returning of the displacement to the original state or after the return of the displacement.

(4) While the apparatus responds to the passage of weather fronts and typhoons, the changes due to such phenomena are small and the waveform is peculiar, and therefore discernible from earthquakes.

(5) Even when an earthquake occurs simultaneous with the weather front or typhoon, the waveform of the earthquake is discernible because of its peculiar features.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. H10-57960, filed Mar. 10, 1998, inclusive of the specification, claims and drawings, are hereby incorporated by reference herein.

What is claimed is:

1. A terrestrial change prediction apparatus, comprising:
an indicator comprising a fixing member made of a nonmagnetic material and two magnetic bodies linearly aligned on said fixing member, each of said magnetic bodies having an N-pole end and an S-pole end and fixedly secured to said fixing member, wherein ends of said magnetic bodies having the same magnetic polarity face each other so that a magnetic repulsive force is produced therebetween; and support means for rotatably supporting said indicator such that said magnetic bodies normally orient in a substantially East and West direction.

2. An apparatus as claimed in claim 1, further comprising indication means for indicating an angular displacement of said magnetic bodies from said East and West direction.

3. An apparatus as claimed in claim 2, further comprising recording means coupled with said indication means for continuously recording displacements of said magnetic bodies indicated by said indication means.

4. An apparatus as claimed in claim 1, further comprising a flexible string having a first end connected to an end portion of said indicator and a second end, and a weight secured to an intermediate portion of said flexible string, said second end being fixed such that said weight is suspended by said flexible string.

5. A terrestrial change prediction apparatus, comprising:

an indicator comprising a fixing member made of a nonmagnetic material and four magnetic bodies each having an N-pole end and an S-pole end and fixedly secured to said fixing member, wherein one of said four magnetic bodies is oriented substantially vertically and the other three magnetic bodies are oriented radially obliquely outward of said one magnetic body, with an angle between any adjacent two magnetic bodies of said the other there magnetic bodies being greater than 90° as viewed vertically, and wherein said other three magnetic bodies all have a lowermost end having the same magnetic polarity as an uppermost end of said one magnetic body, with said lowermost ends facing said uppermost end; and support means for rotatably supporting said indicator such that said magnetic bodies normally orient in a substantially constant direction.

6. A terrestrial change prediction apparatus as claimed in claim 5 wherein said support means is at least one strand by which said fixing member hangs suspended.

7. A terrestrial change prediction apparatus as claimed in claim 1 wherein said two linearly aligned magnetic bodies are spaced apart.

8. A terrestrial change prediction apparatus as claimed in claim 1 wherein said fixing member is an elongated cylinder and wherein said magnetic bodies are coaxial with and spaced apart along said elongated cylinder.

9. A terrestrial change prediction apparatus as claimed in claim 1 wherein said support means is at least one strand by which said fixing member hangs suspended.

* * * * *